July 26, 1949.     J. DE GIER ET AL     2,477,329
CATHODE-RAY TUBE
Filed July 17, 1948
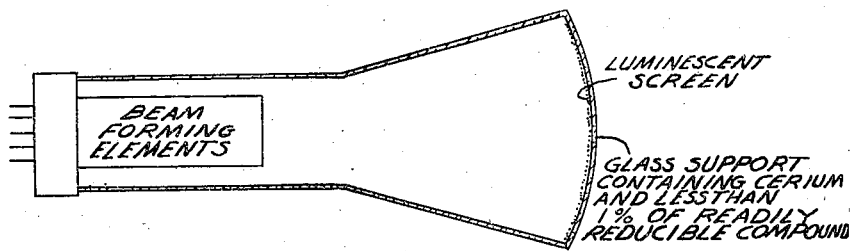
INVENTORS
JOHANNES DE GIER &
JOSEPHUS ANTONIUS MARIA SMELT
BY *Fred M Vogel*
AGENT Patented July 26, 1949

2,477,329

UNITED STATES PATENT OFFICE 2,477,329

CATHODE-RAY TUBE

Johannes de Gier and Josephus Antonius Maria Smelt, Eindhoven, Netherlands, assignors to Hartford National Bank and Trust Company, Hartford, Conn., as trustee Application July 17, 1948, Serial No. 39,284
In the Netherlands March 15, 1948

8 Claims. (Cl. 250—141)

This invention relates to a cathode-ray tube comprising a luminescent screen provided on a glass support.

In cathode-ray tubes, in which an image is produced on a luminescent screen either for television or for oscillograph purposes, it has been known to utilise glass as a support for the luminescent layer. It very often occurs that the luminescent material is provided directly on a part of the wall of the bulb.

During the operation of such cathode-ray tubes, more particularly if high voltages are used, the annoying fact of discoloration of the glass occurs. As has been found from experiments which have led to the present invention, such discoloration is connected with the bombardment by electrons of both the luminescent layer and the glass of the support. The mechanism of the discoloration is not yet quite clear, but it has been found that the discoloration is very slight, if use is made of particular glasses.

Hitherto consideration has only been given to the composition of the glass of the support for the luminescent screen in so far that attention was paid to satisfactory light transmission and to the coefficient of expansion which is connected with the temperature to which the glass is heated.

If use is made of glass which contains not only the elements which are practically necessary in any glass, such as silicon, potassium and sodium, but also cerium, a material improvement may be obtained.

The addition of cerium to glass intended for the manufacture of X-ray tubes is already known from Dutch Patent Specification 17,279 in which it is mentioned that the addition of cerium increases the resistivity of the glass to high potential differences, which becomes manifest in the fact that such glasses containing cerium are not discoloured by the action of X-rays. It is not impossible that X-rays which may arise, for example, by the bombardment of the luminescent material by electrons also play a part in cathode-ray tubes according to the invention and that the addition of cerium thus reduces the discoloration of the glass.

The addition of cerium to ordinary glass is, however, not sufficient to suppress the discoloration of the glass of cathode-ray tubes to such an extent that it is not found to be troublesome in the operation of the tube.

The object of the invention is to provide a cathode-ray tube comprising a colourless glass support for the luminescent screen which glass does not substantially discolour during operation.

A cathode-ray tube according to the invention comprises a luminescent screen provided on a colourless glass support containing cerium, and it exhibits the characteristic that the glass contains 1.00% by weight at the most of readily reducible compounds, such as oxides of lead, antimony or arsenic.

It has been found that discoloration of the glass support does not substantially occur even when a cathode-ray tube according to the invention has been operative for a long time.

As has already been mentioned above, the mechanism of the discoloration is not yet quite explained and hence neither is the influence of the steps which are taken according to the invention in order to counteract discoloration. There are indications, however, that the presence of readily reducible compounds would result in no discoloration or only little discoloration if electrolysis did not occur in the glass at the same time.

Electrolysis phenomena occur if in glass two electrodes are provided, between which a potential difference is maintained, or if glass containing at least one electrode is bombarded by an electron current. As is well known, sodium which occurs in any glass serviceable in practice is substantially wholly responsible for such electrolysis phenomena, although other ions, for example those of potassium, also have a certain influence, though considerably smaller. A so-called lead-tree frequently occurs at one or more of the electrodes provided in the glass, or the glass greatly discolours in the vicinity of the electrode or electrodes. The production of such a lead-tree or dark discoloration could be accounted for by assuming a reduction of the lead compounds and/or other readily reducible compounds contained in the glass. However, it is not described and neither understandable that bombardment of such glasses by electrons may also lead to the formation of a lead-tree or to dark discoloration if no electrodes are provided in the glass. As has previously been mentioned, however, there seems to be a relationship between the electrolytic properties of glass containing readily reducible compounds and the greater or smaller discoloration by the action of an electron bombardment. The smaller the electrolysis phenomena of the glass, the smaller is the discoloration that occurs. It is, however, not possible to manufacture glass which does not exhibit any electrolysis.

Discoloration does not substantially occur, even with electrolysis of the glass by the step according to the invention whereby the amount of readily reducible compounds is chosen to be 1.00% by weight at the most.

In one particular form of cathode-ray tube according to the invention, the glass used for the colourless support of the luminescent screen is a glass which exhibits little electrolysis.

The exact amounts of the readily reducible compounds and of the compounds influencing the electrolysis are dependent on the composition of the glass. Glass which exhibits very small electrolysis and hence contains a small amount of sodium can as a matter of course, contain a greater amount of readily reducible compounds. The total amount of the last-mentioned compounds may, however, not exceed 1.00% by weight. On the other hand it is possible to permit greater electrolysis in glass containing a very small amount of readily reducible compounds.

The glass preferably contains 15% by weight of sodium-oxide at the most.

The readily reducible constituents above referred to are frequently added to glass in order to reduce the melting point thereof or as a purifying agent.

Taking into consideration the requirements which, according to the invention, the glass has to satisfy, it is possible to compose hard glasses and soft glasses by a suitable choice of the constituents. The term "soft glasses" is to be understood in this case to mean those glasses which exhibit a coefficient of expansion higher than $55 \times 10^{-7}$ cm./cm.

The invention will now be explained more fully by reference to the following examples.

EXAMPLE I

Composition of the glass

| | Per cent by weight |
|---|---|
| $SiO_2$ | 66 |
| $Na_2O$ | 5 |
| $K_2O$ | 10 |
| $B_2O_3$ | 2 |
| $BaO$ | 15 |
| $CeO_2$ | 2 |

EXAMPLE II

Composition of the glass

| | Per cent by weight |
|---|---|
| $SiO_2$ | 66 |
| $Na_2O$ | 15 |
| $B_2O_3$ | 2 |
| $BaO$ | 15 |
| $CeO_2$ | 2 |

EXAMPLE III

Composition of the glass

| | Per cent by weight |
|---|---|
| $SiO_2$ | 65 |
| $Na_2O$ | 15 |
| $B_2O_3$ | 2 |
| $BaO$ | 15 |
| $CeO_2$ | 2 |
| $PbO$ | 1 |

EXAMPLE IV

Composition of the glass

| | Per cent by weight |
|---|---|
| $SiO_2$ | 48 |
| $Na_2O$ | 1 |
| $K_2O$ | 10 |
| $CaO$ | 2 |
| $PbO$ | 37 |
| $CeO_2$ | 2 |
| $PbO$ | 1 |

When supports for a luminescent screen are made from the four glasses described in the examples, it appears that, with entirely the same treatment (hence the same bombardment by an electron ray for the same period and at the same temperature), the glass of Example I does not discolour, the glass of Example II is discoloured so as to be just visible, and the glass of Example III is discoloured to a greater extent than the two other glasses. The glass of Example II, in which the potassium of the glass of Example I is substituted by sodium, is considerably inferior in electrolytical respect to that of Example I. However, since the glass does not contain any readily reducible compounds (apart from traces of such compounds which are invariably present) only very slight discoloration occurs despite the high content of sodium and hence the presence of unsatisfactory electrolytical properties. The composition of the glass of Example III is identical with that of the glass of Example II except the addition of 1% of PbO. This addition, however, results in greater discoloration by electron bombardment.

Owing to its small content of sodium, the glass of Example IV has highly satisfactory electrolytical properties. Nevertheless it discolours to a very great extent, which is attributable to the high percentage of lead-oxide. Consequently, such a glass cannot be used in cathode-ray tubes according to the invention.

The single figure of the drawing shows a cathode ray tube partly in section having an envelope comprising a body portion and a glass support member closing said body portion at one end thereof. The glass of the support contains cerium and has less than 1% of readily reducible compounds. A luminescent screen is positioned on the glass support.

What we claim is:

1. A cathode ray tube comprising an envelope having a body portion and an end face closing portion of glass, said glass containing cerium and having not more than 1% by weight of readily reducible compounds, and a luminescent layer on said end face closing portion.

2. A cathode ray tube comprising an envelope having a body portion and an end face closing portion of glass, said glass containing cerium and having not more than 1% by weight of readily reducible compounds of a metal of the group consisting of lead, antimony and arsenic, and a luminescent layer on said end face closing portion.

3. A cathode ray tube, comprising an envelope having a body portion, and an end face closing portion of glass, said glass containing cerium and having not more than 1% by weight of readily reducible compounds and not more than 15% by weight of sodium oxide, and a luminescent layer on said end face closing portion.

4. A cathode ray tube, comprising an envelope having a body portion, an end face closing portion of glass, said glass containing cerium and having not more than 1% by weight of readily reducible compounds and having a coefficient of expansion greater than $55 \times 10^{-7}$ cm./cm., and a luminescent layer on said end face closing portion.

5. A cathode ray tube comprising an envelope having a body portion and an end face closing portion of glass, said glass comprising by weight about 2% of cerium oxide, about 10 to 15% alkali oxide, about 2% of boron trioxide, about 15% of barium oxide and about 66% of silicon dioxide and having not more than 1% by weight of readily reducible compounds, and a luminescent layer on said end face closing portion.

6. A cathode ray tube comprising an envelope having a body portion, and an end face closing portion of glass, said glass comprising approximately

| | Percent by weight |
|---|---|
| $SiO_2$ | 66 |
| $Na_2O$ | 5 |
| $K_2O$ | 10 |
| $B_2O_3$ | 2 |
| $BaO$ | 15 |
| $CeO_2$ | 2 | and a luminescent layer on said end face closing portion.

7. A cathode ray tube comprising an envelope having a body portion, and an end face closing portion of glass, said glass comprising approximately

| | Percent by weight |
|---|---|
| $SiO_2$ | 66 |
| $Na_2O$ | 15 |
| $B_2O_3$ | 2 |
| $BaO$ | 15 |
| $CeO_2$ | 2 | and a luminescent layer on said end face closing portion.

8. A cathode ray tube comprising an envelope having a body portion, and an end face closing portion of glass, said glass comprising approximately

| | Percent by weight |
|---|---|
| $SiO_2$ | 65 |
| $Na_2O$ | 15 |
| $B_2O_3$ | 2 |
| $BaO$ | 15 |
| $CeO_2$ | 2 |
| $PbO$ | 1 | and a luminescent layer on said end face closing portion.

JOHANNES DE GIER.
JOSEPHUS ANTONIUS MARIA SMELT.

No references cited.